June 18, 1963 S. I. LINDELL 3,094,598
CIRCUIT SWITCHING AND PROTECTING MEANS
Filed Aug. 30, 1960 3 Sheets-Sheet 1
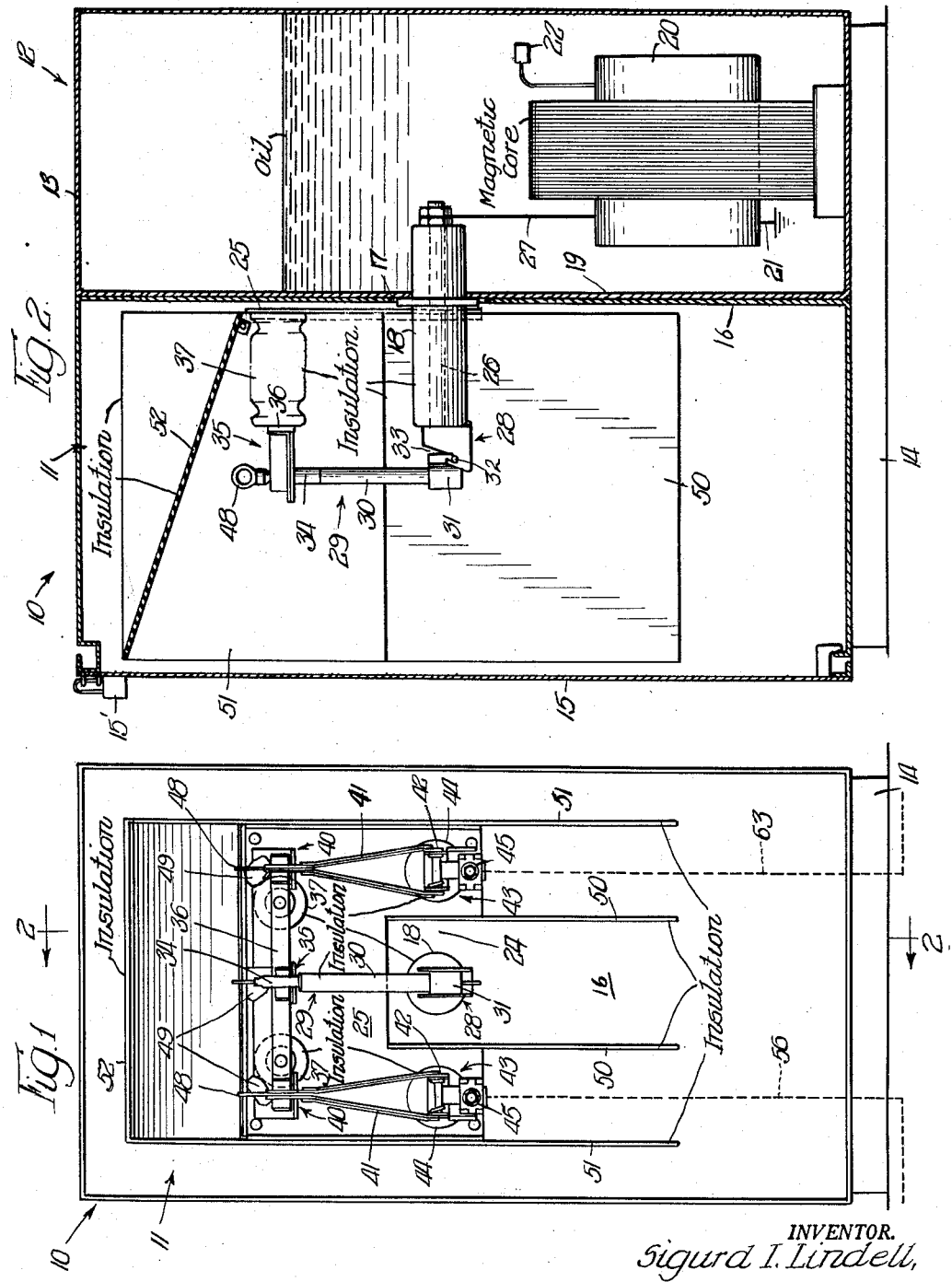
INVENTOR.
Sigurd I. Lindell,
BY
Robert R. Lockwood
atty.

June 18, 1963 S. I. LINDELL 3,094,598
CIRCUIT SWITCHING AND PROTECTING MEANS
Filed Aug. 30, 1960 3 Sheets-Sheet 2
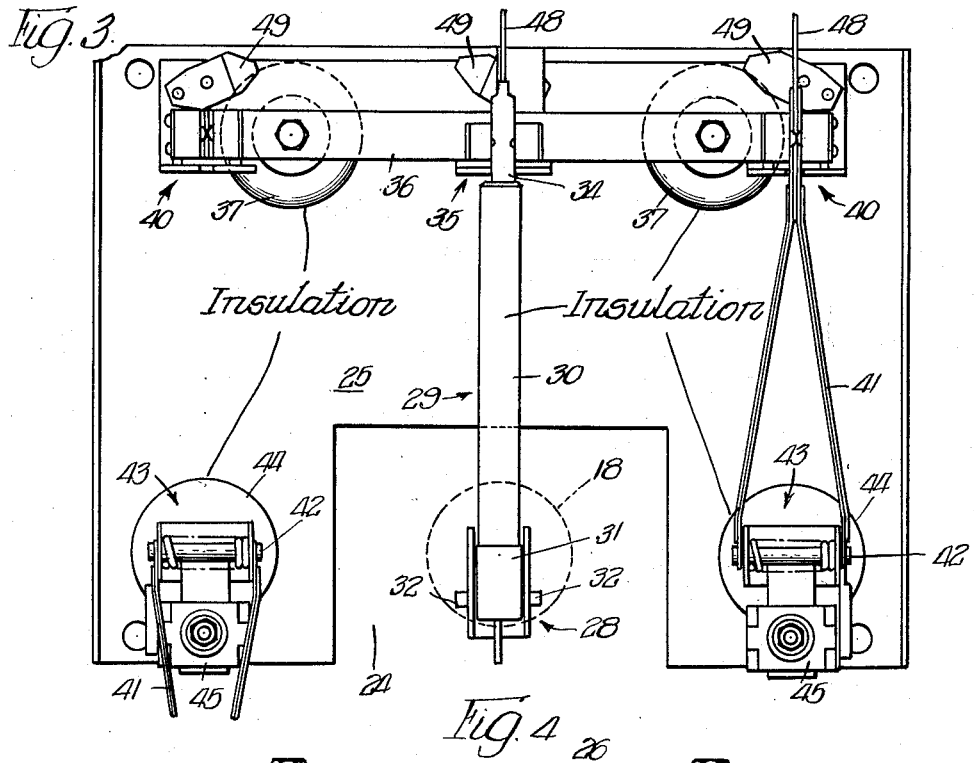
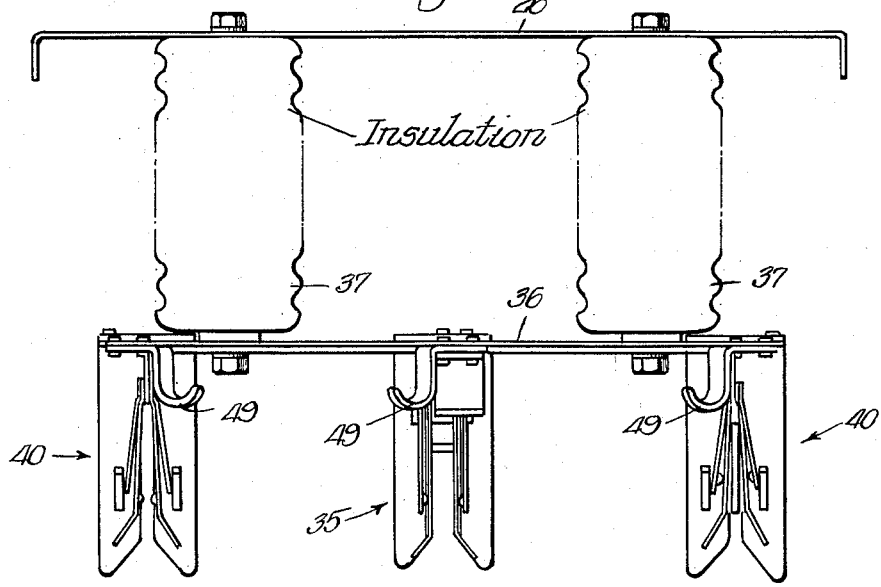
INVENTOR.
Sigurd I. Lindell,
BY
Robert R. Lockwood
atty.

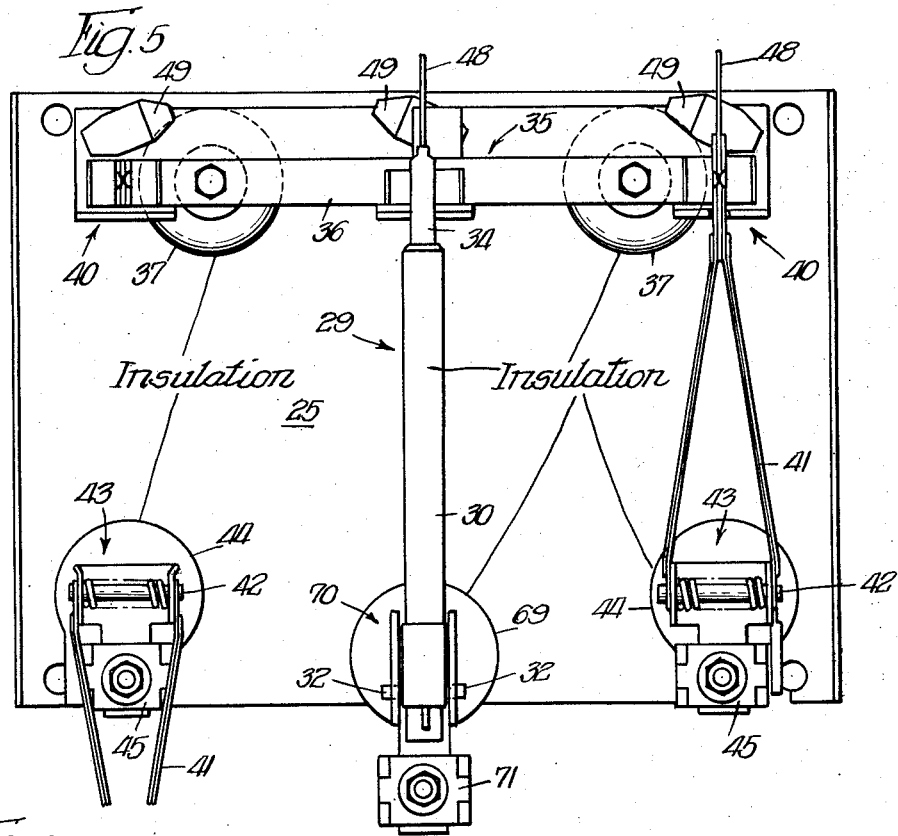
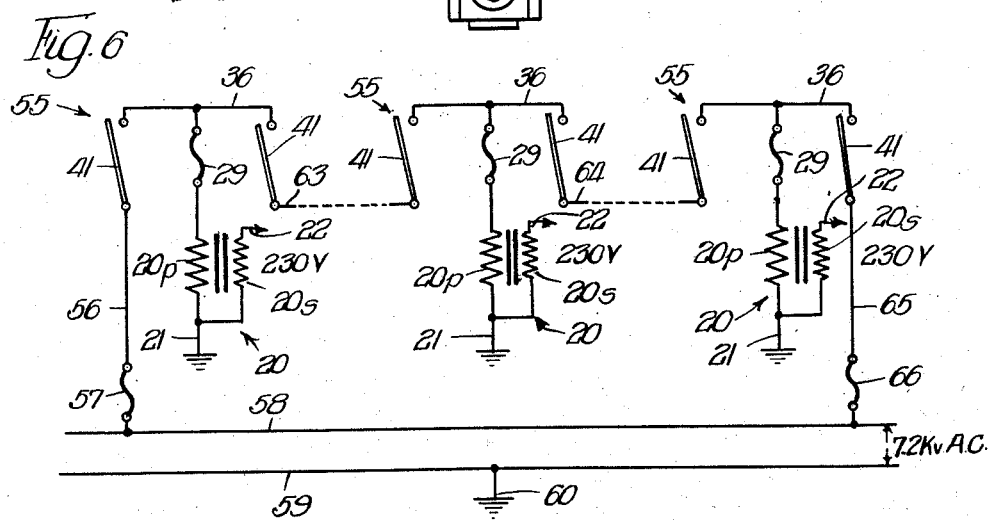

United States Patent Office 3,094,598
Patented June 18, 1963

3,094,598
CIRCUIT SWITCHING AND PROTECTING MEANS
Sigurd I. Lindell, Chicago, Ill., assignor to S & C Electric Company, Chicago, Ill., a corporation of Delaware
Filed Aug. 30, 1960, Ser. No. 52,895
21 Claims. (Cl. 200—114)

The invention relates, generally, to circuit switching and protecting means and it has particular relation to the switching of electric power circuits for energizing distribution transformers that supply electric power principally for household use and for protecting the transformers and feeder conductors thereto in the event of a primary or a secondary fault.

It is now customary to develop residential sub-divisions by constructing most of the homes that are expected to be built at about the same time. This makes it possible to install the various utilities for all of the homes permanently since the number is sufficient to justify the cost of such installations.

The modern home requires a substantial amount of electric power. Provision is now being made in the initial installation to furnish what is estimated to be sufficient capacity to provide for the foreseeable demand. Also, in the interest of appearance and long term economy, such electrical distribution systems are being installed largely under ground. At various central locations throughout the building development concrete slabs or pads are laid on which a relatively small low height metallic housing assembly is mounted comprising a distribution transformer and compartments for the accompanying primary and secondary switching and protecting apparatus. The transformers are energized from a suitable power source through high voltage cables that are buried in trenches. Likewise, the homes in the vicinity of each transformer are supplied with lower voltage electric power over cables that usually are buried in trenches leading from the transformer to the individual property. The present invention particularly concerns the construction and general arrangement of the primary switching and protecting equipment for the transformer and the feeder circuits thereto which equipment is located in a separate metallic housing.

Among the objects of this invention are: To provide new and improved means for switching and protecting feeder circuits and pad mounted transformers used for the underground reception and distribution of electric power for residential use and the like; to provide for switching and protecting a feeder circuit and the associated transformer in such manner that the operation thereof is safe and reliable; to arrange for operating the switching and protecting means by a loadbreak tool, such as that shown in U.S. Patent No. 2,816,981, issued December 17, 1957; to employ one or more switch blades external to the transformer for sectionalizing the primary feeder circuit at each transformer between an incoming cable and an open primary bus; to employ a disconnecting fuse for switching the circuit to the primary winding of the transformer and for protecting it; to arrange the switch blades and fuse in a generally E-configuration with the back of the E-shape being formed by a conductor or bus bar that commonly interconnects the contact assemblies of the switches and the fuse; to provide two switch blades with the fuse therebetween and to individually pivotally mount them in insulated spaced relation; to employ a light weight low cost solid material type fuse that discharges at the pivot end away from the bus bar; to provide a pull ring at the distal end of the fuse and of each switch blade and a corresponding hook on the bus bar for each pull ring for receiving the separable contacting parts of the auxiliary circuit interrupter or loadbreak tool to permit opening of the switch blade or fuse without external arcing; to limit the range of movement of the loadbreak tool in the vicinity of the pull ring and hooks by circumambient insulating barriers; to confine the arc products discharged from the fuse by an insulating barrier or barriers between it and the adjacent switch blade or switch blades; to provide the pivotal mounting for the fuse at the outer end of the insulator bushing that extends from the transformer case or housing and contains the high voltage terminal connection to the primary winding of the transformer and for pivotally mounting the switch blade or switch blades in insulated relation on a vertical metallic plate having an opening through which the transformer bushing projects; to provide for using a single switch blade in conjunction with a fuse; and to provide for pivotally mounting the fuse in insulated relation on the metallic support plate along with the switch blade or switch blades.

In the drawings:

FIG. 1 is a view, in front elevation, of a metallic housing enclosing circuit switching and protecting means constructed in accordance with this invention;

FIG. 2 is a vertical sectional view taken generally along the line 2—2 of FIG. 1;

FIG. 3 is a vertical elevational view, at an enlarged scale, of the circuit switching and protecting means shown in FIGS. 1 and 2 of the drawings;

FIG. 4 is a top plan view of the construction shown in FIG. 3;

FIG. 5 is a view, similar to FIG. 3, but showing the manner in which the line terminal assemblies can be mounted on insulators which are carried by a vertical metallic plate; and FIG. 6 illustrates diagrammatically the circuit connections that can be used in practicing this invention.

Referring now particularly to FIGS. 1 and 2 of the drawings, it will be observed that the reference character 10 designates, generally, a metallic housing which may be formed of sheet steel and have an overall height of the order of forty to fifty inches and a width of the order of twenty-four inches. The metallic housing 10 includes a switching compartment, shown generally at 11, and a transformer shown generally at 12, having its metallic case 13 of about the same height and width as that of the housing 10. The metallic housing 10 and the transformer 12 are mounted on a concrete pad 14 which is in a central location with respect to the homes that are to be supplied with electric power at a relatively low distribution voltage of the order of 230 volts from a high voltage underground cable operating at a voltage of the order of 7.2 kv. alternating current. The front of the metallic housing 10 is closed by a door 15 which is secured against unauthorized opening by a padlock 15'.

The metallic housing 10 has a vertical wall 16 that is juxtaposed to the transformer case 13. The wall 16 is provided with an opening 17 through which projects a high voltage transformer bushing 18 that is mounted on a wall 19 of the transformer case 13. The transformer 12 includes a conventional magnetic core and primary and secondary windings 20 which are commonly grounded at 21. The windings 20 are shown as being immersed in insulating oil but it will be understood that air or other gas can be used for insulating purposes. The ungrounded terminal of the secondary winding is connected to a secondary terminal 22 which is suitably insulated from the transformer case 13. It will be understood that the secondary terminal 22 is connected by an underground conductor or conductors to several residences for the distribution of the low voltage electric power.

The transformer insulator bushing 18 extends through an opening 24 which is located intermediate the sides of a vertical metallic support plate 25 that is suitably mounted within the switching compartment 11. It will be noted that the opening 24 is in the form of a rectangular slot extending upwardly from the lower edge of the metallic support plate 25. A terminal rod 26 extends through the transformer insulator bushing 18 and at one end is connected by a conductor 27 to the high voltage terminal of the primary winding of the windings 20. At its other end the terminal rod 26 is connected to a line terminal assembly 28 on which a fuse, shown generally at 29, is pivotally mounted. The fuse 29 preferably is constructed as disclosed in copending application Serial No. 39,886, filed June 30, 1960. The fuse 29 includes a fuse tube 30 having a lower terminal 31 from which trunnions 32 project for interfitting with slots 33 in the line terminal assembly 28. At its upper end the fuse 29 has an upper terminal 34 that is arranged to have contact engagement with a fuse contact assembly, shown generally at 35, which is mounted on a conductor or bus bar 36. The bus bar 36, shown in more detail in FIGS. 3 and 4 of the drawings, is mounted on insulators 37 which are positioned along the upper edge of the vertical metallic support plate 25 with the bus bar 36 extending horizontally. It will be understood that the fuse 29 is employed for isolating a faulted transformer from its primary feeder and for protecting the windings 20 of the transformer 12 either in the event of the occurrence of a primary fault or in the event of the occurrence of a fault associated with the secondary winding. For this purpose, as disclosed in the application above referred to, the fuse 29 is of the boric acid type which has a relatively high interrupting capacity and it is constructed so that it discharges downwardly away from the bus bar 36 in the event that it is required to interrupt the flow of fault current. The bus bar 36 can be any suitable conductor means as will be understood readily.

It is desired that provision be made for alternate connections of the supply conductors to the fuse 29 so that these supply conductors or feeder cables can be sectionalized at any transformer location. For this purpose switch contact assemblies 40—40 are provided and they are constructed generally similar to the construction of the fuse contact assembly 35 described in more detail in the application above referred to. The switch contact assemblies 40—40 are mounted on the bus bar 36 or other conductor with the fuse contact assembly 35 positioned therebetween. Cooperating with the switch contact assemblies 40—40 are switch blades 41—41 which are pivoted at 42—42 on line terminal assemblies 43—43 that, in turn, are mounted on insulators 44—44 which are carried by the vertical metallic support plate 25. Connection to the line terminal assemblies 43—43 is afforded by line terminal clamps 45—45. It will be observed that the bus bar 36 or other conductor constitutes the back of an E-configuration. The central arm of the E-shape is formed by the fuse 29 while the outermost arms are formed by the switch blades 41—41. If desired, the positions of the fuse 29 and one of the switch blades 41 can be interchanged to place the former on the outside and the switch blades 41—41 adjacent each other. Such arrangements are facilitated by the use of the fuse 29 which discharges downwardly on blowing and by the fact that the fuse contact assembly 35 and the switch contact assemblies 40—40 can be commonly connected together. Also, it is pointed out that the line terminal assembly 28 on which the fuse 29 is mounted and the line terminal assemblies 43—43 for the switch blades 41—41 all are individually insulatingly mounted on support means which may comprise the transformer insulating bushing 18 and its support together with the vertical metallic support plate 25. As will appear hereinafter, provision can be made for mounting the line terminal assembly 28 on an insulator which is directly mounted on the vertical metallic support plate 25. However, by employing the transformer insulator bushing 18 for supporting the line terminal assembly 28, it is possible to dispense with a separate insulator for mounting the line terminal assembly 28 where the transformer 12 is located in the manner described.

It is desirable to provide for opening the fuse 29 and the switch blade 41—41 while current is flowing therethrough. For this purpose the loadbreak tool shown in U.S. Patent No. 2,816,981, issued December 17, 1957, can be used. In order to accommodate its separable contacting parts, pull rings 48 are provided at the distal ends of the fuse 29 and of the switch blades 41—41. Aligned with these pull rings 48 are hook members 49 which are anchored to the bus bar 36 and make contact therewith. It will be observed that the two outer hook members 49 are turned inwardly, as shown more clearly in FIG. 4, in order to facilitate the application of one of the contacting parts of the loadbreak tool or auxiliary circuit interrupter and to permit a compact construction for the metallic housing 10.

In order to isolate the discharge blast of the fuse 29 from the adjacent switch blades 41—41 and circuit connections thereto on the power source side, intermediate insulating barriers 50—50 are provided. They are suitably mounted on the vertical metallic support plate 25 by means not shown. It will be noted that the intermediate insulating barriers 50—50 overlie opposite sides of the fuse 29 and extend part way therealong toward the bus bar 36.

In order to prevent accidental contact of the load interrupter tool or auxiliary circuit interrupter with the walls of the metallic housing 10, side insulating barriers 51—51 are provided in overlying relation to the outer sides of the switch blades 41—41. It will be observed that the side insulating barriers 51—51 extend upwardly from the lower extremities of the intermediate insulating barriers 50—50 to positions well above the bus bar 36. Also an inclined top insulating barrier 52 extends between the side insulating barriers 51—51 and overlying the bus bar 36 and metallic parts mounted on it to limit the upward and inward movement of the loadbreak tool or auxiliary circuit interrupter so as to confine its range of movement to the vicinity of the bus bar 36 and the pull rings 48 all of which are energized at the same voltage when the respective fuse 29 and switch blade 41—41 are closed.

Referring to FIG. 6, it will be observed that the circuit diagram there illustrates a typical installation employing the equipment shown in FIGS. 1, 2, 3 and 4 of the drawings. Here the circuit switching and protecting means are indicated, generally, at 55 as comprising the fuse 29 and the switch blades 41—41 which are associated with the bus bar 36 in the manner described. The fuse 29 is connected to the high voltage terminal of the primary winding 20p which is grounded at 21 as is the secondary winding 20s while its terminal 22 is arranged to be connected by an underground conductor or conductors to one or more residences as the case may be. The left switch blade 41 is connected by an underground conductor 56 through a line fuse 57 to a conductor 58 which may be energized at a voltage, as indicated, of the order of 7.2 kv. alternating current. The conductors 56 and 58 may form the cores of insulated cables having sheaths of metal which constitute a ground conductor 59 that is grounded at 60, in accordance with conventional practice. A similar underground cable connection is provided from the secondary terminal 22 to the residence or residences energized from the windings 20 of the transformer. In some installations the conductor 58 may be an overhead conductor carried on poles.

It was indicated hereinbefore that provision is made for employing a number of the circuit switching and protecting means 55 all commonly energized from the buried cable providing the conductors 58 and 59. Accordingly, an underground conductor 63 serves to connect the circuit switching and protecting means 55 to another similar installation. The conductors 56 and 63 are shown by broken lines in FIG. 1 as extending upwardly through the concrete pad 14 to the line terminal clamps 45—45. By showing the conductor 63 as a broken line, it will be understood that several more of the circuit switching and protecting means 55 can be interposed therein. Likewise an underground conductor 64 serves to interconnect additional circuit switching and protecting means 55 through an underground conductor 65 and line fuse 66; the loop circuit thus provided is connected to the conductor 58. The underground conductors 63, 64 and 65 are constructed, like conductors 56 and 58, as cores of insulated cables having metallic sheaths that are grounded. It will be understood that, with all of the switch blades 41 closed, the electric power flows from the conductor 58 to the loop from either end. On opening any one of the intermediate switch blades 41, it is possible to open the loop so that the feed to the remaining parts is from the ends. This makes it possible to isolate a fault in a transformer or feeder connection thereto and still maintain service on the remaining parts of the loop.

The construction shown in FIG. 5 is similar to that shown in FIGS. 3 and 4 of the drawings. In FIG. 5 instead of providing the opening 24 in the vertical metallic support plate 25, the latter is imperforate and an insulator 69 is mounted along with insulators 44—44 along the lower edge. A line terminal assembly 70, similar to the line terminal assembly 28, is mounted on the insulator 69 and it has a line terminal clamp 71, like the line terminal clamps 45—45, to permit a conductor to be connected thereto. The fuse 29 shown in FIG. 5 is slightly longer than that shown in FIG. 3 and accordingly the line terminal assembly 70 is correspondingly further spaced from the fuse contact assembly 35. It will be apparent that the assembly shown in FIG. 5 can be employed in lieu of that shown in FIG. 3. In such case a conductor is connected between the line terminal clamp 71 and the high voltage terminal of the transformer 12.

It will be understood that the insulators 37, 44 and 69 can be mounted on the wall 16 of the metallic housing 10 instead of on the plate 25. In such case the plate 25 is not used.

In some installations it may not be desirable to employ both switch blades 41—41. Accordingly, one or the other of these switch blades can be omitted together with the corresponding switch contact assembly 40 along with the line terminal assembly 43 and its insulator 44. For such an arrangement the feeder conductor 56, for example, is connected directly to a terminal, not shown, on the bus bar 36. Depending upon the particular application, either the left or the right switch blade 41 and associated parts can be omitted for the construction shown in FIG. 3 or that shown in FIG. 5 as may be required. The fuse 29 then is employed as a means for isolating the primary winding of the associated transformer from the incoming conductor connected to the bus bar 36 on manipulation by the loadbreak tool.

Many advantages result from the use of the switching and protective arrangements disclosed herein:

(1) Visible open disconnecting air gaps are provided on opening the fuse 29 and switch blades 41—41 whereby the lineman is assured that the respective circuit is open.

(2) It is possible to close a faulted circuit in air.

(3) Since the supporting structure, including the support plate 25, is grounded, the flow of leakage currents is prevented when the fuse 29 and switches 41—41 are open and the disconnect gaps in air are established.

(4) It is possible to install or replace the transformer 12 without disturbing the incoming and outgoing primary underground cable connections.

(5) A compact arrangement is permitted which is not unsightly and does not exceed the height and width of the transformer case.

(6) The fuse 29 is located wholly externally to the transformer 12 and thus can be independently switched and can operate to clear a fault without affecting the insulation of the transformer, particularly if it is an oil insulated transformer.

What is claimed as new is:

1. Circuit switching and protecting means comprising, in combination, support means, a pair of switch contact assemblies and a fuse contact assembly mounted in spaced relation, a unitary rigid metallic structure including conductor means electrically interconnecting said contact assemblies, insulator means mounting said contact assemblies and conductor means on said support means, three line terminal assemblies mounted individually in insulated spaced relation on said support means and aligned respectively with said contact assemblies, switch blades pivotally mounted on two of said line terminal assemblies for individual movement into and out of contact engagement in air with the respective switch contact assembly, and a fuse pivotally mounted on the third line terminal assembly for movement into and out of contact engagement in air with said fuse contact assembly and for series connection with said switch blades when they engage the respective switch contact assemblies.

2. Circuit switching and protecting means having a generally E-shaped configuration comprising, in combination, support means, a pair of switch contact assemblies and a fuse contact assembly mounted in spaced relation along the back of the E-shape, a unitary rigid metallic structure including a bus bar electrically interconnecting said contact assemblies and forming the back of the E-shape, insulator means mounting said contact assemblies and said metallic structure including said bus bar on said support means, three line terminal assemblies mounted individually in insulated spaced relation on said support means at the outer ends of the arms of the E-shape and aligned respectively with said contact assemblies, switch blades pivotally mounted on two of said line terminal assemblies for individual movement into and out of contact engagement in air with the respective switch contact assembly and forming two of the arms of the E-shape, and a fuse pivotally mounted on the third line terminal assembly for movement into and out of contact engagement in air with said fuse contact assembly and forming the third arm of the E-shape and for series connection with said switch blades when they engage the respective switch contact assemblies.

3. Circuit switching and protecting means comprising, in combination, support means, a pair of switch contact assemblies and a fuse contact assembly mounted in spaced relation, a unitary rigid metallic structure including a bus bar electrically interconnecting said contact assemblies, insulator means mounting said contact assemblies and said metallic structure including said bus bar on said support means, three line terminal assemblies mounted individually in insulated spaced relation on said support means on the same side of said bus bar and aligned respectively with said contact assemblies, switch blades pivotally mounted on two of said line terminal assemblies for individual movement into and out of contact engagement in air with the respective switch contact assembly, and a fuse having a discharge end and pivotally mounted on the third line terminal assembly for movement into and out of contact engagement in air with said fuse contact assembly and for series connection with said switch blades when they engage the respective switch contact assemblies, the discharge end of said fuse being located at its pivot end whereby on blowing it discharges away from said bus bar.

4. Circuit switching and protecting means for operation by an auxiliary circuit interrupter having a pair of separable contacting conducting parts comprising, in combination, support means, a pair of switch contact assemblies and a fuse contact assembly mounted in spaced relation, a unitary rigid metallic structure including a bus bar electrically interconnecting said contact assemblies, insulator means mounting said contact assemblies and said metallic structure including said bus bar on said support means, three line terminal assemblies mounted individually in insulated spaced relation on said support means on the same side of said bus bar and aligned respectively with said contact assemblies, switch blades pivotally mounted on two of said line terminal assemblies for individual movement into and out of contact engagement in air with the respective switch contact assembly, a fuse pivotally mounted on the third line terminal assembly for movement into and out of contact engagement in air with said fuse contact assembly and for series connection with said switch blades when they engage the respective switch contact assemblies, a pull ring at the distal end of each switch blade and of said fuse to be engaged by one of said separable contacting parts of said auxiliary circuit interrupter, and a hook member individual to each pull ring stationarily mounted on said metallic structure for receiving the other separable contacting part of said auxiliary circuit interrupter.

5. Circuit switching and protecting means for operation by an auxiliary circuit interrupter having a pair of separable contacting conducting parts comprising, in combination, support means, a pair of switch contact assemblies and a fuse contact assembly mounted in spaced relation, a unitary rigid metallic structure including a bus bar electrically interconnecting said contact assemblies, insulator means mounting said contact assemblies and said metallic structure including said bus bar on said support means, three line terminal assemblies mounted individually in insulated spaced relation on said support means on the same side of said bus bar and aligned respectively with said contact assemblies, switch blades pivotally mounted on two of said line terminal assemblies for individual movement into and out of contact engagement in air with the respective switch contact assembly, a fuse pivotally mounted on the third line terminal assembly for movement into and out of contact engagement in air with said fuse contact assembly and for series connection with said switch blades when they engage the respective switch contact assemblies, a pull ring at the distal end of each switch blade and of said fuse to be engaged by one of said separable contacting parts of said auxiliary circuit interrupter, a hook member individual to each pull ring stationarily mounted on said metallic structure for receiving the other separable contacting part of said auxiliary circuit interrupter, insulating barrier means overlying said metallic structure and extending therefrom beyond said line terminal assemblies to limit the range of movement of said auxiliary interrupter, and a pair of intermediate insulating barriers on opposite sides of the intermediate line terminal assembly extending toward and spaced endwise from said metallic structure.

6. Circuit switching and protecting means for operation by an auxiliary circuit interrupter having a pair of separable contacting conducting parts comprising, in combination, support means, a pair of switch contact assemblies and a fuse contact assembly mounted in spaced relation, a unitary rigid metallic structure including a bus bar electrically interconnecting said contact assemblies, insulator means mounting said contact assemblies and said metallic structure including said bus bar on said support means, three line terminal assemblies mounted individually in insulated spaced relation on said support means on the same side of said bus bar and aligned respectively with said contact assemblies, switch blades pivotally mounted on two of said line terminal assemblies for individual movement into and out of contact engagement in air with the respective switch contact assembly, a fuse pivotally mounted on the third line terminal assembly for movement into and out of contact engagement in air with said fuse contact assembly and for series connection with said switch blades when they engage the respective switch contact assemblies, a pull ring at the distal end of each switch blade and of said fuse to be engaged by one of said separable contacting parts of said auxiliary circuit interrupter, a hook member individual to each pull ring stationarily mounted on said metallic structure for receiving the other separable contacting part of said auxiliary circuit interrupter, insulating barrier means overlying said metallic structure and extending therefrom beyond said line terminal assemblies to limit the range of movement of said auxiliary circuit interrupter, and a pair of intermediate insulating barriers on opposite sides of the intermediate line terminal assembly extending toward and spaced endwise from said metallic structure, the outer hook members extending toward each other and away from the juxtaposed insulating barrier means to facilitate application of said other separable contacting part of said auxiliary circuit interrupter.

7. Circuit switching and protecting means comprising, in combination, a vertical metallic support plate having an opening intermediate its sides, insulator means mounted along the upper end of said support plate, a horizontal bus bar carried by said insulator means, a pair of switch contact assemblies and a fuse contact assembly therebetween mounted on said bus bar, a terminal insulator bushing extending through said opening in said support plate and carrying a line terminal assembly aligned with said fuse contact assembly, a fuse pivotally mounted on said line terminal assembly for movement into and out of contact engagement with said fuse contact assembly, a pair of insulators mounted on said support plate on opposite sides of said fuse, a line terminal assembly on each insulator aligned respectively with a switch contact assembly, and a switch blade pivotally mounted on each last mentioned line terminal assembly for movement into and out of contact engagement with the respective switch contact assembly.

8. Circuit switching and protecting means comprising, in combination, a vertical metallic support plate, a pair of insulators mounted along the upper end of said support plate, a horizontal bus bar carried by said insulators, a pair of switch contact assemblies and a fuse contact assembly mounted on said bus bar, three insulators mounted along the lower end of said support plate, a line terminal assembly on each of said three insulators aligned respectively with a contact assembly on said bus bar, switch blades pivotally mounted on two line terminal assemblies for movement into and out of contact engagement wtih the respective switch contact assembly, and a fuse pivotally mounted on the third line terminal assembly for movement into and out of contact engagement with said fuse contact assembly.

9. Circuit switching and protecting means comprising, in combination, support means, a switch contact assembly and a fuse contact assembly mounted in spaced relation, conductor means interconnecting said contact assemblies, insulator means mounting said contact assemblies and conductor means on said support means, a pair of line terminal assemblies mounted individually in insulated spaced relation on said support means and aligned respectively with said contact assemblies, a switch blade pivotally mounted on one of said line terminal assemblies for movement into and out of contact engagement with said switch contact assembly, and a fuse pivotally mounted on the other line terminal assembly for movement into and out of contact engagement with said fuse contact assembly.

10. Circuit switching and protecting means for operation by an auxiliary circuit interrupter having a pair of separable contacting conducting parts comprising, in combination, support means, a fuse contact assembly and a switch contact assembly mounted in spaced relation, a bus bar interconnecting said contact assemblies, insulator means mounting said contact assemblies and said bus bar on said support means, a pair of line terminal assemblies mounted individually in insulated spaced relation on said support means on the same side of said bus bar and aligned respectively with said contact assemblies, a fuse pivotally mounted on one of said line terminal assemblies for movement into and out of contact engagement with said fuse contact assembly, a switch blade pivotally mounted on the other line terminal assembly for movement into and out of contact engagement with said switch contact assembly, a pull ring at the distal end of said fuse and of said switch blade to be engaged by one of said separable contacting parts of said auxiliary circuit interrupter, and a hook member individual to each pull ring stationarily mounted on said bus bar for receiving the other separable contacting part of said auxiliary circuit interrupter.

11. Circuit switching and protecting means for operation by an auxiliary circuit interrupter comprising, in combination, support means, a fuse contact assembly and a fuse switch contact assembly mounted in spaced relation, a bus bar interconnecting said contact assemblies, insulator means mounting said contact asemblies and said bus bar on said support means, a pair of line terminal assemblies mounted individually in insulated spaced relation on said support means on the same side of said bus bar and aligned respectively with said contact assemblies, a fuse pivotally mounted on one of said line terminal assemblies for movement into and out of contact engagement with said fuse contact assembly, a switch blade pivotally mounted on the other line terminal assembly for movement into and out of contact engagement with said switch contact assembly, a pull ring at the distal end of said fuse and of said switch blade to be engaged by one of said separable contacting parts of said auxiliary circuit interrupter, a hook member individual to each pull ring stationarily mounted on said bus bar for receiving the other separable contacting part of said auxiliary circuit interrupter, insulating barrier means overlying said bus bar and extending therefrom beyond said line terminal assemblies to limit the range of movement of said auxiliary circuit interrupter, and an intermediate barrier between said fuse and switch blade and extending toward and spaced endwise from said bus bar.

12. Circuit switching and protecting means comprising, in combination, a vertical metallic support plate having an opening intermediate its sides, insulator means mounted along the upper end of said support plate, a horizontal bus bar carried by said insulator means, a fuse contact assembly and a switch contact assembly mounted on said bus bar, a terminal insulator bushing extending through said opening in said support plate and carrying a line terminal assembly aligned with said fuse contact assembly, a fuse pivotally mounted on said line terminal assembly for movement into and out of contact engagement with said fuse contact assembly, an insulator mounted along the lower end of said support plate, a line terminal assembly on said insulator aligned with said switch contact assembly, and a switch blade pivotally mounted on the last mentioned line terminal assembly for movement into and out of contact engagement with said switch contact assembly.

13. Circuit switching and protecting means for operation by an auxiliary circuit interrupter having a pair of separable contacting conducting parts comprising, in combination, a vertical metallic support plate having an opening intermediate its sides, insulator means mounted along the upper end of said support plate, a horizontal bus bar carried by said insulator means, a fuse contact assembly and a switch contact assembly mounted on said bus bar, a terminal insulator bushing extending through said opening in said support plate and carrying a line terminal assembly aligned with said fuse contact assembly, a fuse pivotally mounted on said line terminal assembly for movement into and out of contact engagement with said fuse contact assembly, an insulator mounted along the lower end of said support plate, a line terminal assembly on said insulator aligned with said switch contact assembly, a switch blade pivotally mounted on the last mentioned line terminal assembly for movement into and out of contact engagement with said switch contact assembly, a pull ring at the distal end of said fuse and of said switch blade to be engaged by one of said separable contacting parts of said auxiliary circuit interrupter, and a hook member individual to each pull ring stationarily mounted on said bus bar for receiving the other separable contacting part of said auxiliary circuit interrupter.

14. Circuit switching and protecting means for operation by an auxiliary circuit interrupter having a pair of separable contacting conducting parts comprising, in combination, a vertical metallic support plate having an opening intermediate its sides, insulator means mounted along the upper end of said support plate, a horizontal bus bar carried by said insulator means, a fuse contact assembly and a switch contact assembly mounted on said bus bar, a terminal insulator bushing extending through said opening in said support plate and carrying a line terminal assembly aligned with said fuse contact assembly, a fuse pivotally mounted on said line terminal assembly for movement into and out of contact engagement with said fuse contact assembly, an insulator mounted along the lower end of said support plate, a line terminal assembly on said insulator aligned with said switch contact assembly, a switch blade pivotally mounted on the last mentioned line terminal assembly for movement into and out of contact engagement with said switch contact assembly, a pull ring at the distal end of said fuse and of said switch blade to be engaged by one of said separable contacting parts of said auxiliary circuit interrupter, a hook member individual to each pull ring stationarily mounted on said bus bar for receiving the other separable contacting part of said auxiliary circuit interrupter, insulating barrier means overlying said bus bar and extending therefrom beyond said line terminal assemblies to limit the range of movement of said auxiliary circuit interrupter, and an intermediate barrier between said fuse and said switch blade and extending toward and spaced endwise from said bus bar.

15. Circuit switching and protecting means comprising, in combination, a vertical metallic support plate, insulator means mounted along the upper end of said support plate, a horizontal bus bar carried by said insulator means, a switch contact assembly and a fuse contact assembly mounted on said bus bar, a pair of insulators mounted along the lower end of said support plate, a line terminal assembly on each of said insulators aligned respectively with a contact assembly on said bus bar, a switch blade pivotally mounted on the line terminal assembly in alignment with said switch contact assembly for movement into and out of contact engagement therewith, and a fuse pivotally mounted on the other line terminal assembly for movement into and out of contact engagement with said fuse contact assembly.

16. For combination with a transformer having a high voltage insulator bushing with a conductor extending therethrough, support means, a pair of switch contact assemblies and a fuse contact assembly mounted in spaced relation, a unitary rigid metallic structure including a bus bar electrically interconnecting said contact assemblies, insulator means mounting said contact assemblies and said bus bar on said support means, three line terminal assemblies mounted individually in insulated spaced relation on said support means on the same side of said bus bar and aligned respectively with said contact assemblies, switch blades pivotally mounted on two of said line terminal assemblies for individual movement into and out of contact engagement in air with the respective switch contact assemblies, a fuse pivotally mounted on the third line terminal assembly for movement into and out of contact engagement in air with said fuse contact assembly and for series connection with said switch blades when they engage the respective switch contact assemblies, said third terminal assembly being adapted for mounting on said high voltage insulator bushing and for connection to said conductor extending therethrough.

17. For combination with a transformer having a high voltage insulator bushing with a conductor extending therethrough, support means, a switch contact assembly and a fuse contact assembly mounted in spaced relation, a unitary rigid metallic structure including a bus bar electrically interconnecting said contact assemblies and adapted to be connected for energization to a high voltage source, insulator means mounting said contact assemblies and said metallic structure including said bus bar on said support means, two line terminal assemblies mounted individually in insulated spaced relation on said support means on the same side of said bus bar and aligned respectively with said contact assemblies, a switch blade pivotally mounted on one of said line terminal members for individual movement into and out of contact engagement in air with said switch contact assembly, a fuse pivotally mounted on the other line terminal assembly for movement into and out of contact engagement in air with said fuse contact assembly and for series connection with said switch blade when it engages said switch contact assembly, said other terminal assembly being adapted for mounting on said high voltage insulator bushing and for connection to said conductor extending therethrough.

18. In combination, support means, a unitary rigid metallic structure including a bus bar, a first pair of stationary switch assemblies mounted in spaced relation on and electrically connected by said bus bar, insulator means mounting said metallic structure including said bus bar and said switch assemblies on said support means, a fuse connected to said bus bar, a second pair of stationary switch assemblies mounted individually in insulated spaced relation on said support means and aligned respectively with the switch assemblies of said first pair, and a switch blade interconnecting the aligned switch assemblies of each pair and arranged and adapted for individual movement into and out of contact engagement in air with one of the switch assemblies of one pair to connect said fuse in series with said switch blades and the respective switch assemblies when the switch blades are in closed circuit positions.

19. The invention, as set forth in claim 18, wherein the support means comprises a vertical metallic plate, the metallic structure including the bus bar is mounted on insulator means extending laterally from said plate, and each of the second pair of switch assemblies is mounted on an individual insulator extending laterally from said plate.

20. Circuit switching and protecting means comprising, in combination, support means, a pair of switch contact assemblies and a fuse contact assembly mounted in spaced relation, a unitary rigid metallic structure including conductor means electrically interconnecting said contact assemblies, insulator means mounting said contact assemblies and conductor means on said support means, three line terminal assemblies mounted individually in insulated spaced relation on said support means and aligned respectively with said contact assemblies, switch blades pivotally mounted on two of said line terminal assemblies for individual movement into and out of contact engagement in air with the respective switch contact assembly, a fuse pivotally mounted on the third line terminal assembly for movement into and out of contact engagement with said fuse contact assembly and for series connection with said switch blades when they engage the respective switch contact assemblies, and a pair of intermediate insulating barriers on opposite sides of the intermediate line terminal assembly extending toward and spaced from said switch and fuse contact assemblies.

21. For combination, with a transformer having a primary winding, support means, a first pair of disconnecting switch contact assemblies, a fuse commonly connected to said pair of switch contact assemblies and arranged and adapted to be connected to said primary winding, insulator means mounting said switch contact assemblies on said support means, a second pair of disconnecting switch contact assemblies mounted individually in insulated spaced relation on said support means and aligned respectively with said first pair of switch contact assemblies and arranged and adapted to be connected to individual energizing circuits, and a disconnecting switch blade pivotally mounted on each of said switch contact assemblies of said second pair for individual movement into and out of contact engagement in air with the respective switch contact assembly of said first pair to connect said fuse in series circuit relation therewith.

References Cited in the file of this patent

UNITED STATES PATENTS

| | | |
|---|---|---|
| 1,197,957 | Sachs | Sept. 12, 1916 |
| 1,543,370 | Chase | June 23, 1925 |
| 1,970,558 | Dexter | Aug. 21, 1934 |
| 2,292,706 | Mammel et al. | Aug. 11, 1942 |
| 2,816,984 | Lindell | Dec. 17, 1957 |
| 2,843,703 | Grepe | July 15, 1958 |

FOREIGN PATENTS

| | | |
|---|---|---|
| 416,633 | Great Britain | Sept. 18, 1934 |